United States Patent [19]

Iacoviello

[11] 3,856,734

[45] Dec. 24, 1974

[54] AQUEOUS EMULSION OF INTERPOLYMER OF VINYL ACETATE N-METHYLOL ACRYLAMIDE AND ACRYLIC ACID

[75] Inventor: John G. Iacoviello, Somerville, N.J.

[73] Assignee: Air Products and Chemicals, Inc., Allentown, Pa.

[22] Filed: June 28, 1973

[21] Appl. No.: 374,402

Related U.S. Application Data

[62] Division of Ser. No. 139,828, May 3, 1971, Pat. No. 3,770,680.

[52] U.S. Cl.... 260/29.6 TA, 117/148, 117/155 UA, 117/161 UT, 260/17 R
[51] Int. Cl. ............................................. C08f 45/72
[58] Field of Search............260/29.6 TA, 29.6 B, 260/29.6 BE, 29.6 M

[56] References Cited
UNITED STATES PATENTS

| | | | |
|---|---|---|---|
| 2,595,954 | 5/1952 | Kunze et al. | 260/29.6 BE X |
| 3,053,787 | 9/1962 | Suen et al. | 260/29.6 M |
| 3,135,648 | 6/1964 | Hawkins | 260/29.6 BE |
| 3,203,918 | 8/1965 | Goldberg et al. | 260/29.6 B |
| 3,497,521 | 2/1970 | Bouchard | 260/29.6 B |

Primary Examiner—Lucille M. Phynes
Attorney, Agent, or Firm—Bernard M. Weiss; Barry Moyerman

[57] ABSTRACT

A grit-free, aqueous polymer emulsion, useful, for instance, as a base for a wood adhesive, is prepared by aqueous dispersion polymerization of vinyl acetate, N-methylol acrylamide, and acrylic acid in amounts sufficient to provide a thermosettable interpolymer containing about 5 to 20 weight percent of N-methylol acrylamide, about 1 to 3 weight percent of acrylic acid, and a balance consisting essentially of vinyl acetate.

5 Claims, No Drawings

AQUEOUS EMULSION OF INTERPOLYMER OF VINYL ACETATE N-METHYLOL ACRYLAMIDE AND ACRYLIC ACID

This is a division, of application Ser. No. 139,828, filed May 3, 1971 now U.S. Pat. No. 3,770,680 granted Nov. 6, 1973.

This invention relates to a grit-free, aqueous emulsion of a thermosettable interpolymer, to methods of making the emulsion, and to products prepared from the emulsion. More particularly, it concerns a grit-free, aqueous emulsion of a thermosettable interpolymer of vinyl acetate, N-methylol acrylamide, and acrylic acid, to methods of making same, to adhesive compositions formulated from the emulsion, and to laminates prepared by using the adhesives.

The preparation of aqueous emulsions of thermosettable interpolymers of vinyl acetate and N-methylol acrylamide has often yielded gritty products, i.e., emulsions which contain solid particles that are sufficiently large as to be retained on a 150 mesh screen (U.S. Sieve Series). This grittiness renders the emulsions unsuitable for most coating or adhesive applications, and various methods of overcoming the problem have been proposed. Thus, in U.S. Pat. Nos. 3,288,740 and 3,301,809 aqueous emulsions of interpolymers of vinyl acetate and N-methylol acrylamide are prepared by polymerizing the monomers while in admixture either with an alkaline earth metal salt of an alpha, beta-unsaturated monocarboxylic acid or with polyvinyl alcohol.

It has now been discovered that a grit-free emulsion of a thermosettable interpolymer of vinyl acetate and N-methylol acrylamide can also be obtained by including acrylic acid in the polymerization mixture in an amount sufficient to provide about 1 to 3 weight percent of polymerized acrylic acid in the resultant interpolymer product. Moreover, this smooth emulsion product can be obtained even though the interpolymer is substantially devoid of either or both of polyvinyl alcohol and alkaline earth metal salt of alpha, beta-unsaturated monocarboxylic acid. The polymer emulsion of this invention is an excellent base composition for aqueous emulsion adhesives, most particularly for adhesives which are useful in plywood manufacture, as will hereinafter be discussed in more detail.

The grit-free polymer emulsion of this invention can be readily prepared by (1) forming an aqueous dispersion of (a) catalytically effective amounts of a suitable redox catalyst system, (b) about 5 to 20 weight percent of vinyl acetate monomer, and (c) a balance consisting essentially of water; (2) agitating the dispersion and maintaining it at a pH of about 4 to 6 and a temperature of about room temperature to 100°C., so as to initiate and sustain addition polymerization of the vinyl acetate; (3) maintaining the vinyl acetate monomer concentration in the dispersion at about 5 to 20 weight percent for about the first 5–15 minutes after initiation of the polymerization and thereafter maintaining it at about 1½ to 5 weight percent until all of the vinyl acetate has been added to the dispersion; and (4) adding to the dispersion during the polymerization about 6 to 15 parts of N-methylol acrylamide per each 100 parts by weight of total monomers employed, and about 1 to 3 parts of acrylic acid per each 100 parts by weight of total monomers employed.

Preferred conditions for the polymerization include a reaction temperature of about 40° to 80°C.; an initial vinyl acetate concentration of about 5 to 15, most preferably about 5 to 7, weight percent; and about 6 to 10 parts of N-methylol acrylamide added per part of vinyl acetate.

As stated above, the catalyst system is of the redox type, for example a mixture of t-butyl hydroperoxide (as the oxidizing agent, also called the "initiator") and sodium bisulfite (as the reducing agent, also called the "activator.") It is also preferred to have trace amounts of ferrous ion present in the reaction mixture in order to initiate the polymerization. As a suitable source of ferrous ion may be mentioned, for example, ferrous ammonium sulfate.

The addition of the N-methylol acrylamide and acrylic acid to the polymerization dispersion is preferably effected incrementally and uniformly over the period during which the balance of the vinyl acetate is added, often about 1 to 5 or more hours. Polymerization is preferably continued after all of the monomers have been added and until the vinyl acetate monomer concentration drops to about 0.5 weight percent or lower. The overall time of the polymerization reaction will usually be about 1 to 6, 7 or more hours.

The water content of the dispersion is preferably maintained between about 40 weight percent and about 60 weight percent during the polymerization, and the overall ratio of monomers employed is approximately the same as desired in the interpolymer product.

The pH of the polymerization mixture is maintained at about 4 to 6 by the inclusion of a suitable alkaline buffering agent in the reaction mixture, such as, for example, disodium phosphate, sodium acetate, or sodium benzoate. The amount of buffering agent is generally about .8 to 1.2 percent, based on the weight of monomers. The emulsion product will have a longer shelf life if the pH is 5 or more. If desired, then, the pH of the final emulsion can be elevated slightly by the addition of a base such as ammonium hydroxide.

The product resulting from the polymerization method of the present invention is a grit-free, aqueous emulsion of a thermosettable interpolymer of additively combined units of vinyl acetate, N-methylol acrylamide, and acrylic acid, wherein the interpolymer contains about 5 to 20, preferably about 7 to 15, weight percent of polymerized N-methylol acrylamide, about 1 to 3 weight percent of polymerized acrylic acid, and a balance consisting essentially of polymerized vinyl acetate. The emulsion resulting from the polymerization reaction generally contains about 40 to 60 weight percent of water and has a viscosity, if adjusted to a water content of 50 weight percent, of about 300 to 2,500 centipoises, as determined at 25°C. with a Brookfield viscometer using a No. 4 spindle at 6 revolutions per minute.

Depending on the intended use for the emulsion, it may be desired to add one or more thickening agents to it. If it is to be used as a base composition for formulating a wood adhesive, for example, it will generally be preferred that it have a viscosity of about 2,000 to 7,000, most advantageously about 4,000 to 6,000, centipoises, determined in the manner described above at 50 percent concentration. Suitable thickening agents for use with the emulsion of this invention include, for example, the cellulosic thickeners, e.g. methyl cellulose and hydroxyethyl cellulose. When formulating a wood adhesive, the amount of such a thickening agent that will usually be required to reach the desired viscosity will be about 0.5 to 1.5 percent, based on the weight of solids in the emulsion.

Formulation of an adhesive composition from the emulsion of the present invention is readily achieved by adding to the emulsion an effective amount of an acidic curing catalyst for the interpolymer. As examples of suitable curing catalysts may be mentioned chromium nitrate, aluminum chloride, phosphoric acid, chromic acid, oxalic acid, nitric acid, and citric acid. The amount of catalyst employed will generally be that which is sufficient to adjust the pH of the emulsion to about 1 to 3. This will usually require a minor amount, e.g. about 1 to 10 percent, based on the weight of solids in the composition.

Curing of the adhesive compositions of the present invention will generally begin to take place at room temperature as soon as the catalyst and polymer emulsion have been intimately admixed, and the pot life of the compositions is generally no longer than about 3 days. Thus, the formulation should not be prepared except at or near the intended time of use.

The curing of the adhesive is best effected at elevated temperatures and with the work pieces held together under pressure. The adhesives of this invention are excellent for use in preparing laminates containing two or more superposed layers of solid material, e.g. wood, paper or fabric, and are especially suitable for manufacturing water-resistant plywood. In the latter application, suggested cure times will vary with pH, choice of catalyst, viscosity, etc., but it is generally advantageous to cure the adhesive at about 225°F. to 300°F. for about 3 to 15 minutes.

EXAMPLE

The following ingredients are charged to a 10 gallon, glass lined, Pfaudler kettle:

900g Vinyl Acetate
10,000g Deionized H$_2$O
30g Disodium Phosphate
40g Ferrous Ammonium Sulfate
(1 wt. % aqueous solution)
15g Tertiarybutyl hydroperoxide.

The resultant mixture, the pH of which is about 4.5, is heated to 60°C. under a nitrogen atmosphere. Polymerization is then initiated with 50ml. of an activator solution consisting of:

300g Sodium Bisulfite
225g Disodium Phosphate
3,000g Deionized H$_2$O

Upon initiation there are continuously and simultaneously added subsurface to the mixture, over a 2 hour period, two separate monomer charges consisting of:

| Charge 1 | Charge 2 |
|---|---|
| 2750g N-methylol acrylamide (60 wt.% aqueous solution) | 14,596g Vinyl Acetate |
| | 166g Acrylic Acid |
| 1928g Deionized H$_2$O | 46g Tertiary butyl hydroperoxide (70 wt.% pure: balance consisting of other peroxides and diperoxides). |

The reaction temperature is maintained between 60°–65°C. with an average cooling jacket temperature of 36°C. Additional activator solution is charged to the kettle to maintain the polymerization and the vinyl acetate free monomer level is kept between 3 and 4 wt. percent. Approximately 1,900 ml of activator solution has been consumed by the end of the reaction. The reaction mixture is cooled when the vinyl acetate free monomer level reaches 0.4 wt. percent. The final pH of the emulsion is 4.8. The emulsion is free of grit, rendering it ideally suited for use as a base for a wood adhesive. So as to lengthen the emulsion's shelf life, the pH is raised to 5.0 by the addition of ammonium hydroxide to the emulsion.

The emulsion solids constitute about 54 wt. percent of the emulsion, and the viscosity (measured at 50 percent water concentration by a Brookfield viscometer at 25°C. using a No. 4 spindle at 6 rpm) is about 360 centipoises (cps).

Samples of emulsions prepared as described above were supplied with a curing catalyst and subjected to pot-life and wood adhesive tests, the results of which are reported hereinafter in Tables I through III.

Referring now to Table I, the following explanations are pertinent:

All of the emulsions tested were substantially the same except for solids content. Thus, Pfaudler No. 11, Pfaudler No. 14, and Pfaudler No. 20 each contained about 50 weight percent solids, while Emulsion No. 60-4003 contained about 55 weight percent solids and Emulsion No. J-72 contained about 52.8 weight percent solids.

"Methocel" is used to designate a 5 weight percent aqueous solution of "Methocel HG-D.G.S.," a methyl cellulose of 50,000 cps. viscosity. "Natrosol" is used to designate a hydroxyethyl cellulose marketed under that trademark, and "Cellosize HEC" is used to designate another brand of hydroxyethyl cellulose thickening agent.

The aluminum chloride hydrate was added in the form of a 50 weight percent aqueous solution, and the reported parts by weight are with reference to the solution.

"Initial pH" is the pH of the emulsion after all of the additives had been incorporated in it.

With regard to Table II, the viscosities reported therein were determined at 25°C. with a Brookfiled viscometer, using a No. 4 spindle.

The following explanations are with regard to Table III:

The test samples were 3 ply laminates of 1/16 inch thick birch veneer which had been prepared using the test emulsion as the adhesive and an open time of 3 minutes. Each laminate was cured for 15 minutes at 225°F. and 200 psi. and then aged for 2 weeks at room temperature.

The cold water and boiling water shear strength tests were performed according to the provisions of paragraphs 5.3.2 and 5.3.3. of the U.S. Department of Commerce's Commodity Standard CS 45-60. The cold water test involved immersion of the laminate for 48 hours in room temperature water, followed by subjection to three cycles of 8 hours in a 150°F. oven and 16 hours in room temperature water. The boiling water test involved immersion in boiling water for 4 hours, followed by drying for 20 hours in a 150°F. oven, followed by reimmersion for 4 hours in boiling water. The sample was then permitted to cool to room temperature before testing.

Each sample was tested while wet for shear strength on an Instron tester at a crosshead speed of 0.5 inch per minute, a chart speed of 5 inches per minute, and at a jaw span of 1¼ inches.

TABLE I

| RUN NO. | EMULSION NO. | INGREDIENTS (Parts by Weight) | | | | | INITIAL pH |
|---|---|---|---|---|---|---|---|
| | | Emulsion | Methocel | Natrosol | Cellosize HEC | AlCl$_3$6H$_2$O | |
| 1 | Pfaudler No. 11 | 200 | 15 | | | 10 | 2.1 |
| 2 | Pfaudler No. 14 | 200 | 15 | | | 10 | 2.2 |
| 3 | Pfaudler No. 20 | 200 | 15 | | | 10 | 2.1 |
| 4 | 60-4003 | 182 | | 1 | | 10 | — |
| 5 | J-72 | 190 | | | 1 | 10 | — |

TABLE II

VISCOSITIES (Centipoises)

| Run No. | Initial | | After 24 Hours | After 48 Hours | After 96 Hours | After 120 Hours | After 144 Hours | After 168 Hours | After 2 Weeks |
|---|---|---|---|---|---|---|---|---|---|
| | 6 RPM | 60 RPM | 6 RPM | 6 RPM | 6 RPM | 6 RPM | 6 RPM | 6 RPM | 6 RPM |
| 1 | 7300 | 2280 | 14500 | | 39000 | 45000 | 53000 | 58000 | Gelled |
| 2 | 5100 | 3000 | 29000 | | 71000 | Gelled | | | |
| 3 | 2600 | 1400 | 9600 | 26000 | | 52000 | 53500 | 67000 | Gelled |

TABLE III

SHEAR STRENGTHS

| | Cold Water Test | | Boiling Water Test | |
|---|---|---|---|---|
| Run No. | Shear Strength (lb./sq.in.) | Wood Failure(%) | Shear Strength (lb./sq.in.) | Wood Failure(%) |
| 1 | 359 | 95 | 266 | 65 |
| 2 | 409 | 95 | 264 | 35 |
| 3 | 308 | 75 | 228 | 100 |
| 4 | — | — | 218 | 100 |
| 5 | — | — | 234 | 90 |

I claim:

1. An aqueous emulsion of a thermosettable interpolymer of additively combined units of vinyl acetate, N-methylol acrylamide, and acrylic acid, said interpolymer containing about 5 to 20 weight percent of polymerized N-methylol acrylamide, about 1 to 3 weight percent of polymerized acrylic acid, and a balance consisting essentially of polymerized vinyl acetate, said emulsion containing an effective amount of an acidic curing catalyst selected from the group consisting of chromium nitrate, aluminum chloride, phosphoric acid, chromic acid, oxalic acid, nitric acid and citric acid, about 40 to 60 weight percent of water, and said emulsion being substantially devoid of solid particles having a size larger than 150 mesh (U.S. Sieve Series).

2. The emulsion of claim 1 wherein the curing catalyst is added in an amount sufficient to adjust the pH to about 1 to 3.

3. the emulsion of claim 1 wherein the curing catalyst is added in a range from about 1 to 10 percent, based on the weight of solids in the emulsion.

4. An aqueous emulsion of a thermosettable interpolymer of additively combined units of vinyl acetate, N-methylol acrylamide, and acrylic acid, said interpolymer containing about 7 to 15 weight percent of polymerized N-methylol acrylamide, about 1 to 3 weight percent of polymerized acrylic acid and a balance consisting essentially of polymerized vinyl acetate, and said interpolymer being substantially devoid of polyvinyl alcohol and alkaline earth metal salt of alpha, beta-unsaturated monocarboxylic acid, said emulsion containing an effective amount of a thermosettable catalyst selected from the group consisting of chromium nitrate, aluminum chloride, phosphoric acid, chromic acid, oxalic acid, nitric acid and citric acid for the interpolymer, about 40 to 60 weight percent of water, said emulsion being substantially devoid of solid particles having a size larger than 150 mesh (U.S. Sieve Series), and said emulsion having a pH of about 4 to 6 and a viscosity, if adjusted to a water content 50 weight percent, of about 4,000 to 6,000 centipoises as determined at 25°C. with a Brookfield viscometer using a No. 4 spindle at 6 revolutions per minute.

5. The emulsion of claim 4 wherein the thermosettable catalyst is added in a range from about 1 to 10 percent, based on the weight of solids in the emulsion.

* * * * *